United States Patent
Matsuoka et al.

(10) Patent No.: US 7,315,309 B2
(45) Date of Patent: Jan. 1, 2008

(54) COLOR-INFORMATION PROCESSING METHOD, AND PROGRAM

(75) Inventors: Hirochika Matsuoka, Chiba (JP); Suzuko Fukao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1056 days.

(21) Appl. No.: 10/057,950

(22) Filed: Jan. 29, 2002

(65) Prior Publication Data
US 2002/0101456 A1     Aug. 1, 2002

(30) Foreign Application Priority Data
Jan. 29, 2001   (JP)   ............................... 2001-020381

(51) Int. Cl.
*G09G 5/00*   (2006.01)
(52) U.S. Cl. ...................... 345/587; 345/591; 345/594; 345/604
(58) Field of Classification Search ................ 345/587, 345/591, 594, 604
See application file for complete search history.

(56) References Cited

U.S. PATENT DOCUMENTS

| | | | | |
|---|---|---|---|---|
| 5,416,890 A | * | 5/1995 | Beretta | ........................ 345/590 |
| 5,581,376 A | * | 12/1996 | Harrington | .................. 358/518 |
| 5,611,030 A | * | 3/1997 | Stokes | ......................... 345/590 |
| 6,225,974 B1 | * | 5/2001 | Marsden et al. | ............. 345/590 |
| 6,522,778 B1 | * | 2/2003 | Tamagawa | ................... 382/167 |
| 6,807,315 B1 | * | 10/2004 | Walmsley et al. | .......... 382/263 |
| 2002/0036786 A1 | | 3/2002 | Kondo | ........................ 358/1.9 |
| 2002/0122207 A1 | * | 9/2002 | Klassen et al. | .............. 358/2.1 |

FOREIGN PATENT DOCUMENTS

JP      2002-112054      4/2002

OTHER PUBLICATIONS

U.S. Appl. No. 09/095,546, filed Jun. 11, 1998.
U.S. Appl. No. 09/420,778, filed Oct. 19, 1999.
U.S. Appl. No. 09/624,376, filed Jul. 27, 2000.

* cited by examiner

*Primary Examiner*—Matthew C. Bella
*Assistant Examiner*—Mike Rahmjoo
(74) *Attorney, Agent, or Firm*—Fitzpatrick, Cella, Harper & Scinto

(57) ABSTRACT

In order to perform pseudo-three-dimensional display for analyzing color distribution, there are provided a color-distribution-information input step of inputting color-distribution information indicating color coordinate values that sample points in a first color system can have in a second color system, a user's-instruction input step of inputting an instruction of a user relating to an operation of generating object-surface information, and a generation step of generating three-dimensional-object-surface information in accordance with the instruction of the user, based on the color-distribution information.

7 Claims, 24 Drawing Sheets

FIG.3

STEPS OF R VALUES : 0,32,64, ... ,224,255

STEPS OF G VALUES : 0,32,64, ... ,224,255

STEPS OF B VALUES : 0,32,64, ... ,224,255

L*a*b COORDINATES OF GRID(0,0,0) : (30,0,-2)

L*a*b COORDINATES OF GRID(0,0,1) : (31,2,-9)

⋮

L*a*b COORDINATES OF GRID(0,0,8) : (34,18,-33)

L*a*b COORDINATES OF GRID(0,1,0) : (34,-8,0)

⋮

L*a*b COORDINATES OF GRID(8,8,7) : (90,-4,12)

L*a*b COORDINATES OF GRID(8,8,8) : (92,0,0)

FIG.5

MESSAGE LIST

{ ZOOM_INOUT, MOVE, RASTERIZE_MODE, CHANGE_GRIDAREA, CHANGE_SCOPE, CHANGE_HUEAREA, CHANGE_DISPLAYSURFACE, PROCESS_END }

FIG.8

SELECTION OF DISPLAY MODE

■ WIRE-FRAME DISPLAY

☐ POINT DISPLAY

☐ SOLID DISPLAY 1

☐ SOLID DISPLAY 2

☐ SOLID DISPLAY 3

FIG.12

**SELECTION OF RANGE OF GRIDS
TO BE DISPLAYED**

RANGE OF R-AXIS GRID　　2 ～ 5

RANGE OF G-AXIS GRID　　2 ～ 4

RANGE OF B-AXIS GRID　　1 ～ 4

FIG.15

SELECTION OF INTERNAL LAYER
TO BE DISPLAYED

INTERNAL LAYER
TO BE DISPLAYED   １

FIG.18

SELECTION OF RANGE OF HUES TO BE DISPLAYED

- ☑ RY REGION
- ☐ YG REGION
- ☐ GC REGION
- ☐ CB REGION
- ☐ BM REGION
- ☐ MR REGION

FIG.21

SELECTION OF DISPLAY SURFACE

- ☑ WMYR SURFACE
- ☑ WYCG SURFACE
- ☐ WCMB SURFACE
- ☐ HUE SURFACE 1

- ☐ KMYR SURFACE
- ☐ KYCG SURFACE
- ☐ KCMB SURFACE
- ☐ HUE SURFACE 2

COLOR-INFORMATION PROCESSING METHOD, AND PROGRAM

BACKGROUND OF THE INVENTION

1. Field of the Invention

The present invention relates to a color-information processing method for performing pseudo-three-dimensional display in order to analyze a color distribution.

2. Description of the Related Art

Recently, with the widespread use of personal computers and work stations, desktop publishing (DTP) and CAD (computer aided design) have been widely used. In such a situation, a color reproducing technique of colors represented on a monitor using color materials becomes important. In DTP, for example, in a computer system including a color monitor and a color printer, formation, editing, processing of a color image are performed on a monitor, and the obtained color image is output from the color printer. The user strongly desires that the color image on the monitor perceptually matches with the output image from the printer.

In the color reproducing technique, however, it is difficult to achieve perceptual matching between the color image on the monitor and the output image from the printer because of the following reasons.

That is, in the color monitor, a color image is represented by emitting light of a specific wavelength using a phosphor for each color pixel. On the other hand, in the color printer, a color image is represented by absorbing light of a specific wavelength using ink or the like and utilizing remaining reflected light for each color pixel. Due to such a difference in the image display mode, the color reproduction range greatly differs between the two types of color images. Even in color monitors, the color reproduction range differs among a liquid-crystal monitor, a CRT (cathode-ray tube) using electron guns, and a plasma display. Likewise, in color printers, the color reproduction range depends on the quality of paper, the amount of use of ink, and so on. Therefore, to achieve the perceptual matching among color images in display media having different color reproduction ranges, various gamut mapping techniques exist.

Although the quality of these various gamut mapping techniques is determined ultimately by subjective evaluation for various input images, it is costly and also difficult to reflect the result of the evaluation upon the gamut mapping technique. Accordingly, an analysis/evaluation method for a gamut mapping technique is needed, in which the result of the analysis/evaluation can be reflected on the gamut mapping technique.

As conventional analyzing techniques for determining the quality of a gamut mapping technique, calculation of the sum of color differences for all colors, evaluation of a color difference for each color, and the like are used.

However, because an image is obtained by combining color information and spatial information, quality of gamut mapping technique must be evaluated by taking into consideration whether or not spatial information is well preserved when image is color-converted by gamut mapping. Well/ill preserving spatial information depends on whether or not gradation is well preserved by a gamut mapping. However, since the above-described quantitative evaluation method does not take gradation information into account, only one side of the gamut mapping technique can be evaluated.

In addition, since color information is distributed in a three-dimensional space, the amount of quantitative-evaluation information is large, hence it is difficult to obtain the desired local information.

SUMMARY OF THE INVENTION

The present invention has been made in consideration of the above-described problems. It is an object of the present invention to allow simple quantitative evaluation of color information from various view-point such as color difference, and so on.

According to one aspect, the present invention which achieves the above-described object relates to a color-information processing method for performing pseudo-three-dimensional display in order to analyze color distribution. The method includes a color-distribution-information input step of inputting color-distribution information indicating color coordinate values that sample points in a first color system take in a second color system, a user's-instruction input step of inputting an instruction of a user relating to an operation of generating object-surface information, and a generation step of generating three-dimensional-object-surface information in accordance with the instruction of the user, based on the color-distribution information.

According to another aspect, the present invention which achieves the above-described object relates to a program for executing a color-information processing method for performing pseudo-three-dimensional display in order to analyze color distribution. The program includes a color-distribution-information input step of inputting color-distribution information indicating color coordinate values that sample points in a first color system can have in a second color system, a user's-instruction input step of inputting an instruction of a user relating to an operation of generating object-surface information, and a generation step of generating three-dimensional-object-surface information in accordance with the instruction of the user, based on the color-distribution information.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 3 is a diagram illustrating a format of a color-distribution-information file;

FIG. 5 is a diagram illustrating a message list;

FIG. 8 is a diagram illustrating a user interface for selecting a display mode;

FIG. 12 is a diagram illustrating a user interface for selecting a range of grids to be displayed;

FIG. 15 is a diagram illustrating a user interface for selecting an internal layer to be displayed;

FIG. 18 is a diagram illustrating a user interface for selecting a range of hues to be displayed;

FIG. 21 is a diagram illustrating a user interface for selecting a display surface;

DETAILED DESCRIPTION OF THE PREFERRED EMBODIMENT

In a preferred embodiment of the present invention, a color-information analyzing apparatus is described, in which various types of display of three-dimensional distribution of color information is performed, in order to evaluate the distribution quantitatively/intuitively.

More specifically, color-distribution information indicating what color coordinates sample points regularly arranged in an RGB color system take in a L*a*b* color system is obtained. After generating three-dimensional-object-surface information based on the color-distribution information, the three-dimensional-object-surface information is subjected to pseudo-three-dimensional display. The user instructs/selects in what display mode surfaces of an object are to be displayed.

According to this embodiment, for example, it is possible to qualitatively/intuitively determine/evaluate local/overall information relating to gamut mapping. Since it is possible to exactly grasp/determine local problems in gamut mapping, the result of determination can be promptly reflected on a gamut mapping technique.

Figure 1:
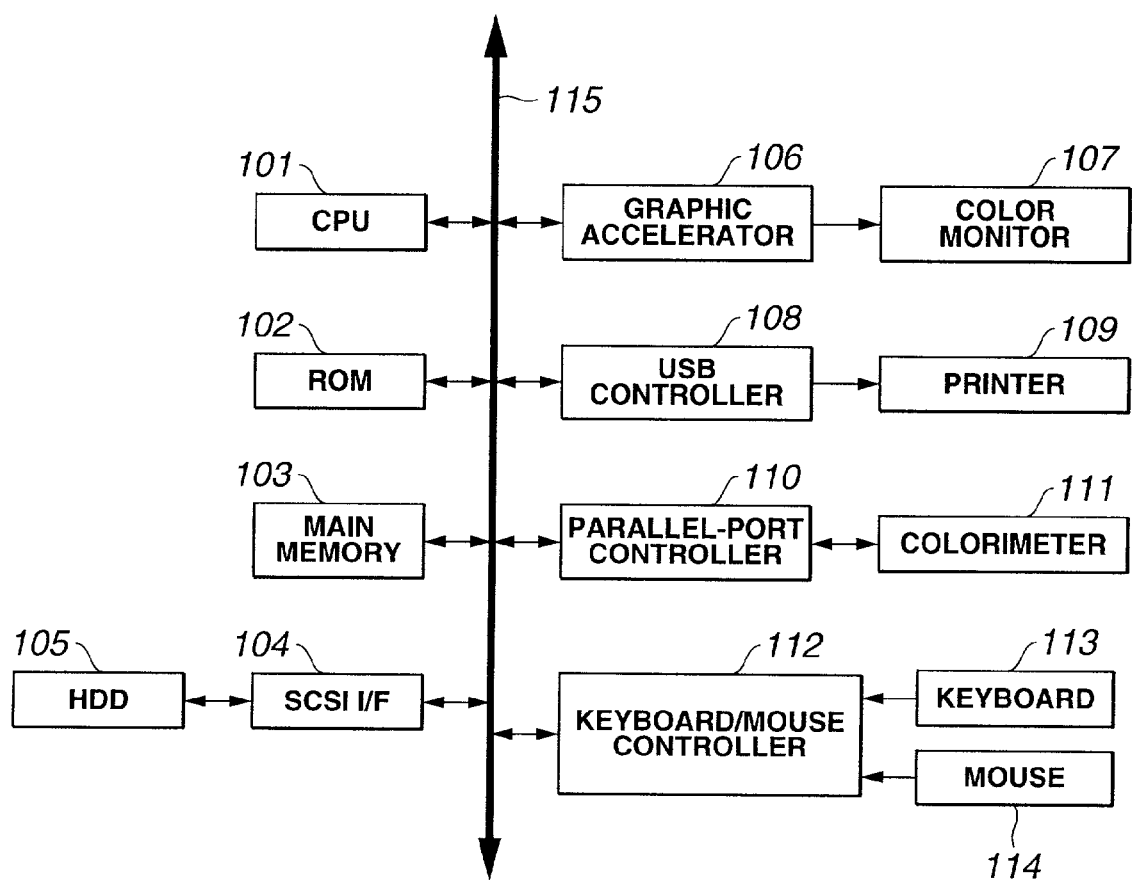
FIG. 1 is a block diagram illustrating the system configuration of a color-information analyzing apparatus according to an embodiment of the present invention.

FIG. 1 is a block diagram illustrating the system configuration of a color-distribution analyzing apparatus according to the embodiment. In FIG. 1, there are shown a CPU (central processing unit) 101, a ROM (read-only memory) 102, a main memory 103, an SCSI (small computer system interface) IF 104, an HDD (hard-disk drive) 105, a graphic accelerator 106, a color monitor 107, a USB (universal serial bus) controller 108, a color printer 109, a parallel-port controller 110, a colorimeter 111, a keyboard/mouse controller 112, a keyboard 113, a mouse 114, and a PCI (peripheral component interconnect) bus 115. The CPU 101 executes various types of processing (to be described later) in accordance with programs/data stored in the ROM 102 and the HDD 105.

In the above-described configuration, when the user performs color analysis, a computer system operates according to the following procedure.

When the user instructs start of the operation of a color analysis program via the keyboard 113 and the mouse 114, the CPU 101 reads the color analysis program from the HDD 105 and stores the read program in the main memory 103, and executes the program from a predetermined address. The executed color analysis program first requests the user to assign a color-distribution-information file to be analyzed. When the user has input the path information for the concerned color-distribution-information file through the keyboard 113 and the mouse 114, the color analysis program stores the concerned file in the main memory 103. After initializing various data, a state of awaiting input from the user is provided. Then, in response to an instruction of an operation from the user, color-information-distribution data stored in the main memory 103 is appropriately processed, and the obtained data is displayed on the color monitor 107 via the graphic accelerator 106. The operation of the color analysis program will be described later in detail.

Color-distribution data stored in the color-distribution-information file in this embodiment will now be described.

Figure 2:
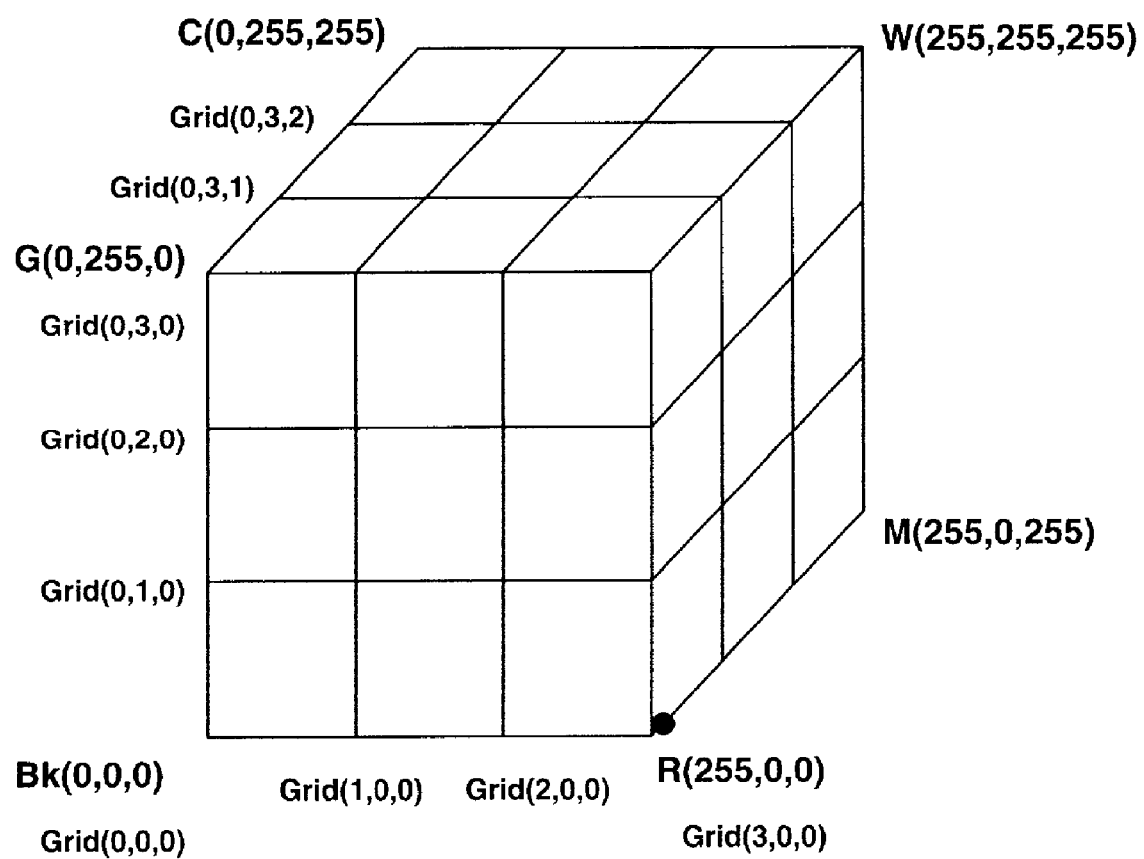
FIG. 2 is a schematic diagram illustrating arrangement of grid points in an RGB color space.

The color-distribution data describes correspondence between RGB-color-coordinate data of grid points in a RGB color space and L*a*b* coordinate values in a L*a*b* color space. FIG. 2 is a schematic diagram illustrating grid points in the RGB color space. In FIG. 2, four grid points are provided in each of R, G and B axes, and RGB values of black (Bk), green (G), red (R), cyan (C) and white (W) sample points, and grid coordinates of sample points represented by grid numbers are described.

A data format within the file will now be described with reference to FIG. 3. At heads of the file, steps of R, G and B values are described. Then, sets of color-distribution data are described in the sequence of nesting in the order of R, G and B. The L*a*b* coordinate values are described in the file in the order of L* values, a* values and b* values. FIG. 3 illustrates a file format when the number of grid points is 9 in each of R, G and B axes.

The color-distribution-information file is generated by converting results of gamut mapping processing for color coordinates of grid points in the RGB color space into L*a*b* data. By thus generating the color-distribution-information file, it is possible to qualitatively/intuitively determine/evaluate local/overall information relating to gamut mapping, using the color analysis program (to be described later). Since it is possible to exactly grasp/determine local problems in gamut mapping, the result of evaluation can be promptly reflected on a gamut mapping technique.

A patch image is formed by using color coordinates of grid points as color patches. The formed patch image is displayed on the monitor or output to the printer, and is subjected to colorimetry using a colorimeter. By generating the color-distribution-information file according to this approach, color distribution indicating output characteristics of a device can be obtained.

In generation of the color-distribution-information file, perception adaptation processing according to CIECAM 97s or the like may be used.

Figure 4:
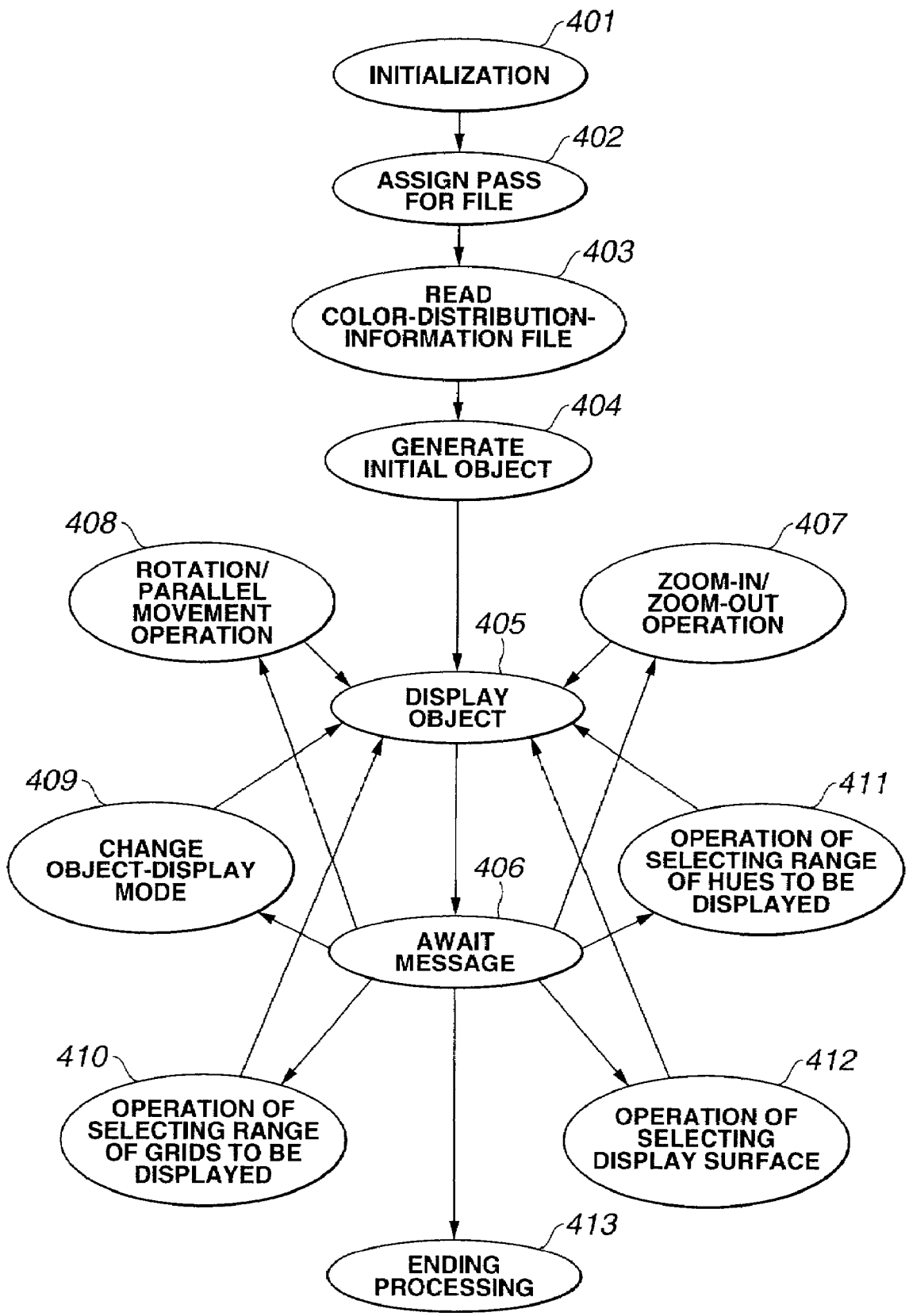
FIG. 4 is a flowchart illustrating a processing operation of the color-information analyzing apparatus shown in FIG. 1.

The operation of processing of the color analysis program in the embodiment will now be described with reference to the flowchart shown in FIG. 4. First, in step 401, the started color analysis program performs an initialization operation such as reservation of heap memory. Then, in step 402, input of pass information for the color-distribution-information file from the user is awaited. If the input path information is invalid, the process returns to step 402. If the input path information is valid, the process proceeds to step 403. In step 403, the color-distribution-information file is read based on the path information, and the file is stored in the heap memory. In step 404, initial formation of 3D-object data is performed based on the color-distribution data, and geometry information and display-mode information when performing 3D display are initialized. The generation and display of 3D-object data in step 404 will be described later. In step 405, 3D-object data is appropriately displayed on the monitor based on the display-mode information and the geometry information (display viewpoint/positional information). The geometry information includes the position and the angle of rotation of a 3D object, the coordinates and the angle of rotation of a screen, the coordinates of a viewpoint, a line-of-sight vector in the world coordinate system. Then, in step 406, a message is awaited. Upon reception of a message, the process proceeds to a step for performing the operation corresponding to the message.

Each type of operation corresponding to a message mentioned in step 406 will now be described. A message list is as shown in FIG. 5.

(Message ZOOM_INOUT)

Upon detection of a message ZOOM_INOUT in step 405, the amount of ZOOM IN/OUT attached to the message is extracted, and the process then proceeds to step 407. In step 407, geometry information relating to the coordinates of a screen and the coordinates of a viewpoint is updated, and the process then proceeds to step 405. In step 405, display of 3D-object data is updated based on the updated geometry information.

(Message MOVE)

Upon detection of a message MOVE in step 405, the amount of parallel movement of a viewpoint/the amount of rotation of the viewpoint attached to the message is extracted, and the process then proceeds to step 408. In step 408, geometry information relating to the coordinates of the viewpoint and a line-of-sight vector is updated based on the extracted amount of parallel movement of the viewpoint/the amount of rotation of the viewpoint, and the process then proceeds to step 405. In step 405, display of 3D-object data is updated based on the updated geometry information.

(Message RASTERIZE_MODE)

Upon reception of a message RASTERIZE_MODE in step 405, information relating to selection of a display mode attached to the message is extracted, and the process then proceeds to step 409. In step 409, information relating to a display mode is updated based on the extracted information relating to selection of a display mode, and the process then proceeds to step 405. In step 405, display of 3D-object data is updated based on the updated information relating to a display mode.

(Message CHANGE_GRIDAREA)

Upon reception of a message CHANGE_GRIDAREA in step 405, information relating to selection of a range of grids to be displayed attached to the message is extracted, and the process then proceeds to step 410. In step 410, 3D-object data is updated based on the extracted information relating to selection of a range of grids to be displayed, and the process then proceeds to step 405. In step 405, the updated 3D-object data is displayed.

(Message CHANGE_SCOPE)

Upon detection of a message CHANGE_SCOPE in step 405, information relating to selection of an internal layer to be displayed attached to the message is extracted and converted into information relating to selection of a range of grids to be displayed, and the process then proceeds to step 410. In step 410, 3D-object data is updated based on the information relating to selection of a range of grids to be displayed, and the process then proceeds to step 405. In step 405, the updated 3D-object data is displayed.

(Message CHANGE_HUEAREA)

Upon detection of a message CHANGE_HUEAREA in step 405, information relating to selection of a range of hues to be displayed is extracted, and the process then proceeds to step 411. In step 411, 3D-object data is updated based on the extracted information relating to selection of a range of hues to be displayed attached to the message, and the process then proceeds to step 405. In step 405, the updated 3D-object data is displayed.

(Message CHANGE_DISPLAYSURFACE)

Upon detection of a message CHANGE_DISPLAYSURFACE in step 405, information relating to selection of a display surface attached to the message is extracted, and the process then proceeds to step 412. In step 412, 3D-object data is updated based on the extracted information relating to selection of a display surface, and the process then proceeds to step 405. In step 405, the updated 3D-object data is displayed.

(Message PROCESS_END)

Upon detection of a message PROCESS_END in step 405, the process proceeds to step 413. In step 413, after performing operations of ending processing, such as releasing of the heap memory, the color analysis program is ended.

A description will now be provided of generation/updating of 3D-object data and display of color-information-distribution data in this embodiment.

Figure 6:
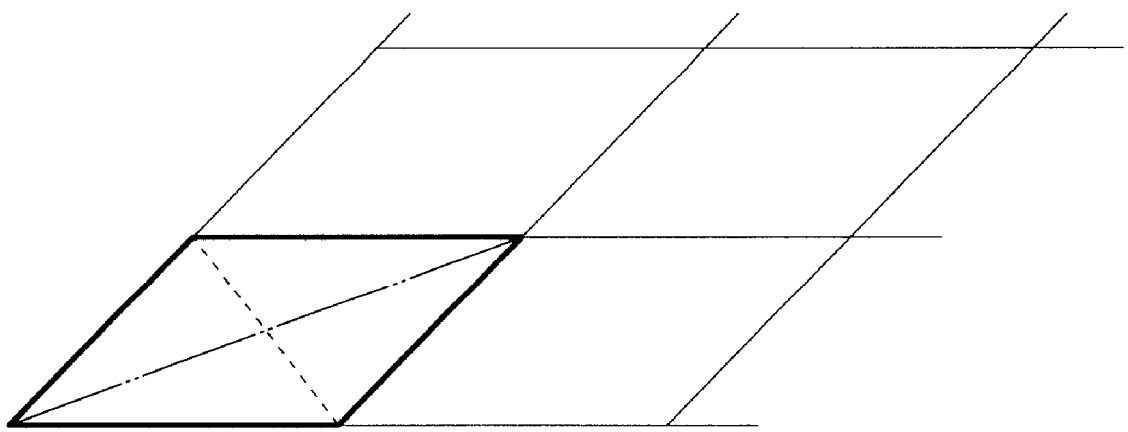
FIG. 6 is a diagram illustrating minimum quadrangles formed by grid points.

Initial generation and display of 3D-object data in step 404 will now be described. When generating 3D-object data, first, on the surface of a maximum grid region in the RGB color space, two combinations of triangles are generated in each of minimum quadrangles formed by grid points. FIG. 6 is a schematic diagram illustrating such combinations of triangles. In FIG. 6, a region surrounded by thick lines is a minimum quadrangle formed by grid points. In this region, two combinations of triangles, i.e., a combination of two triangles obtained by dividing the quadrangle by the broken line, and a combination of two triangles obtained by dividing the quadrangle by two-dot broken lines, are generated. Grid-point coordinates of vertices of these triangles are converted into corresponding L*a*b* coordinate values using color-distribution-information data, and 3D-object data is provided from combinations of triangles after conversion. A combination of triangles is selected from the two combinations so as to maximize the volume of the 3D-object data. That is, when N minimum quadrangles formed by grid points are present in a RGB color space, 3D-object data is selected from $2^N$ combinations.

Figure 7:
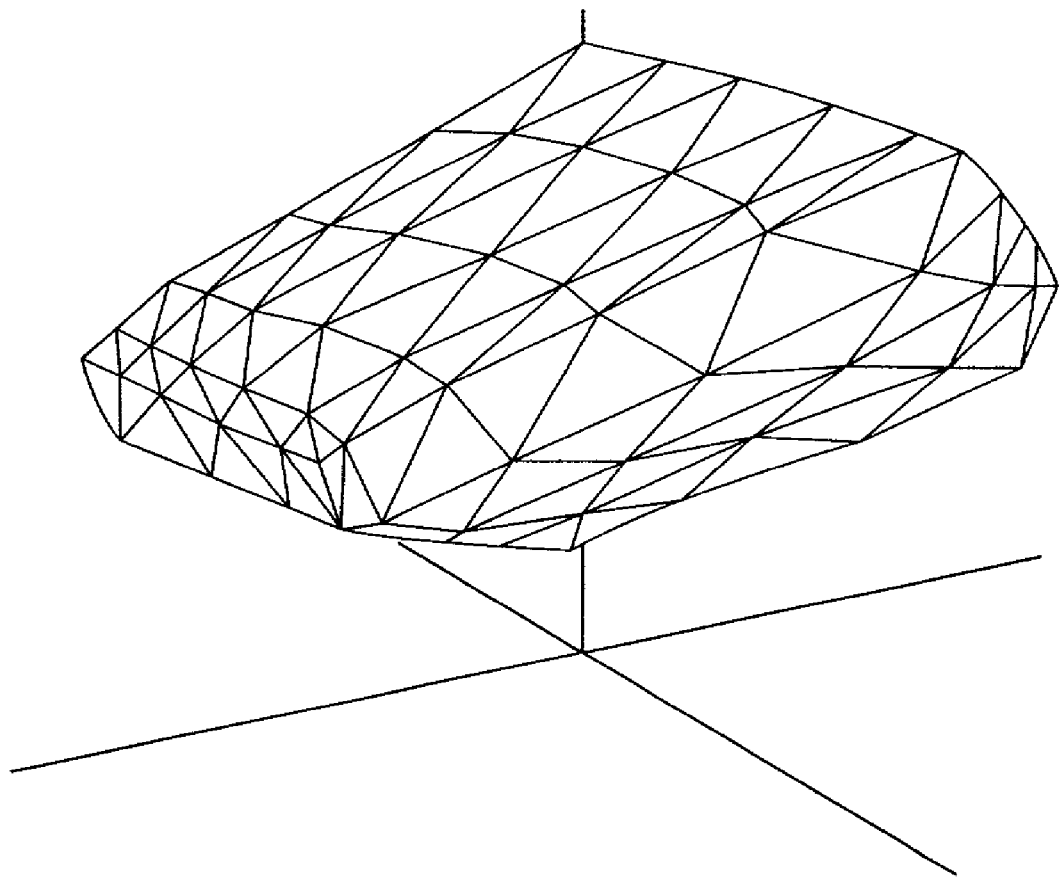
FIG. 7 is a diagram illustrating an example of display of 3D-object data.

FIG. 7 illustrates an example of display on the color monitor 107 in the embodiment.

Selection of a display mode in step 409 and corresponding display will now be described. The following five display modes are prepared: wire-frame display, point display, solid display 1, solid display 2, and solid display 3, are prepared. In the solid display 1, a 3D object is provided in the form of triangle-patch data of the 3D-object data, and the color of a surface of the object is calculated from grid-point coordinate values in the RGB color space. In the solid display 2, a 3D object is displayed with curved surfaces based on the 3D-object data, and the color of a surface of the object is calculated from grid-point coordinate values in the RGB color space.

Figure 9:
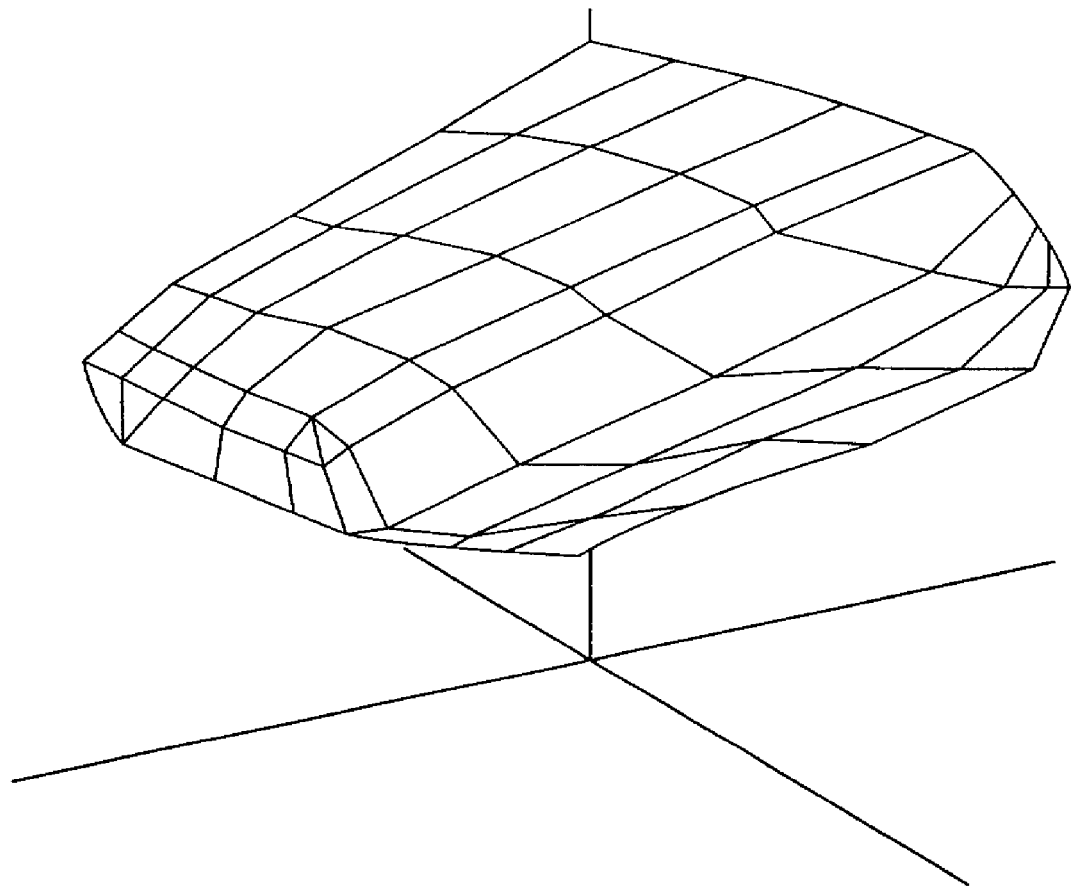
FIGS. 9-11 are diagrams, each illustrating an example of display of 3D-object data.
Figure 10:
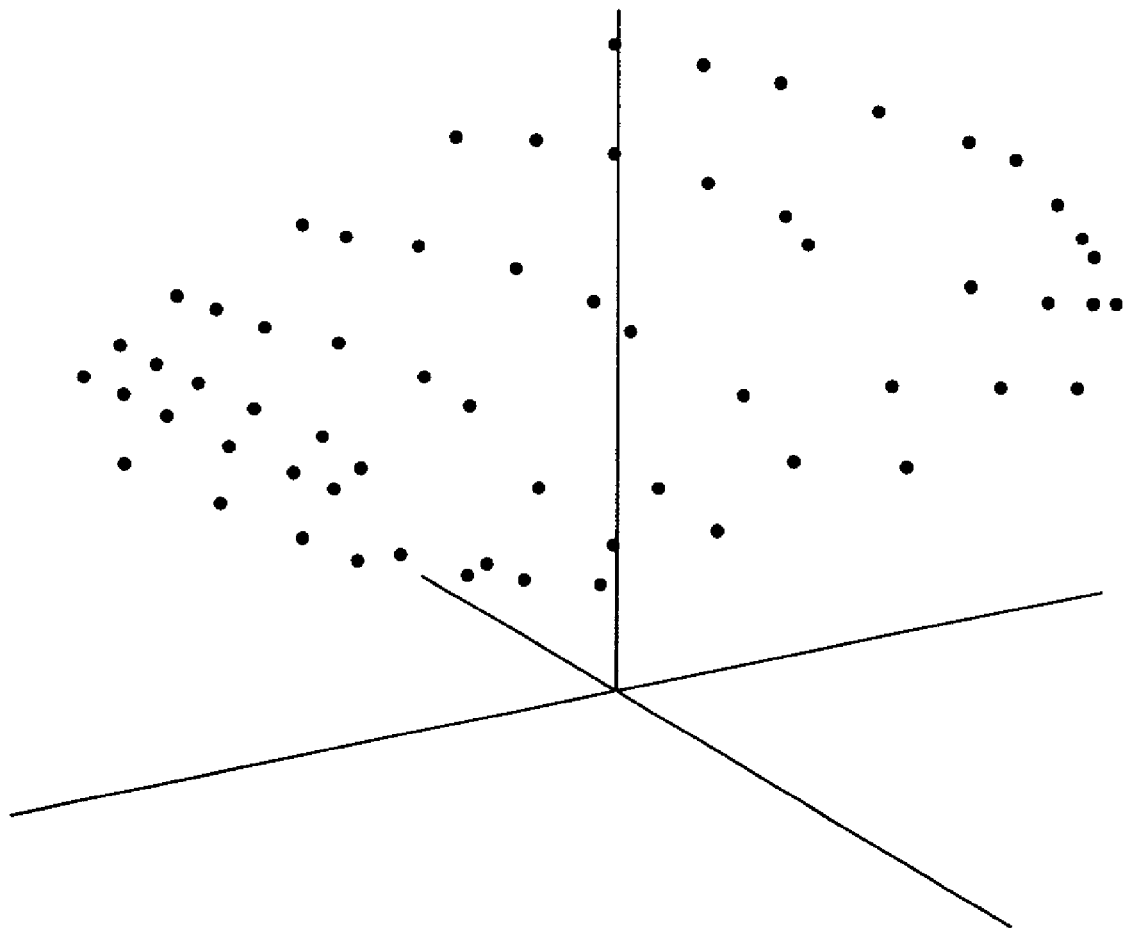
Figure 11:
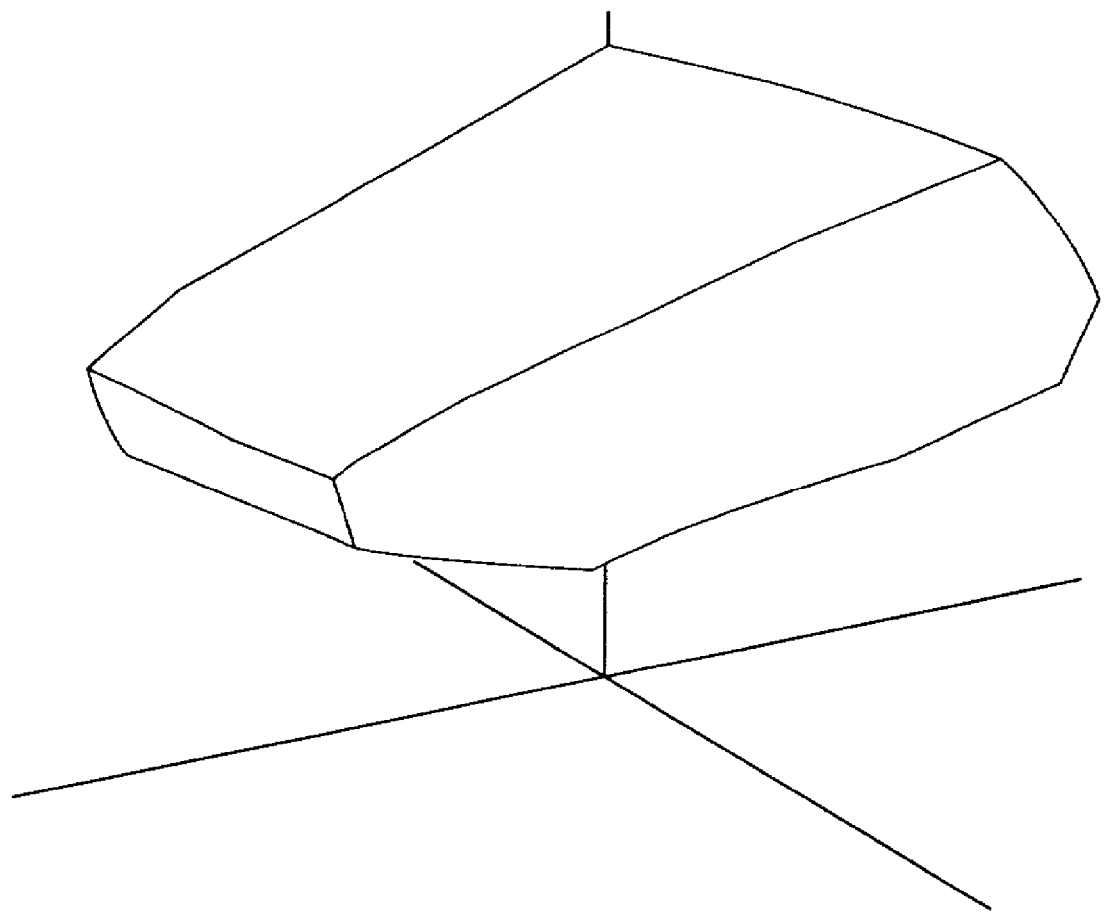

In the solid display 3, a 3D object is provided in the form of triangle-patch data of the 3D-object data, and the color of a surface of the object is calculated from coordinate values in a L*a*b* color space, serving as a display space. The user selects a display mode using a user interface shown in FIG. 8. The display-mode-selection message RASTERIZE_MODE is then notified to the color analysis program, which changes the display mode in accordance with selection information attached to the message in the above-described manner. FIG. 9 is a schematic diagram illustrating a display on the monitor when the wire-frame display has been selected. FIG. 10 is a schematic diagram illustrating a display on the monitor when the point display has been selected. To simplify the illustration, hidden surfaces which are actually displayed, are omitted. FIG. 11 is a schematic diagram illustrating a display on the monitor when the solid display 2 has been selected. When the solid display 1 and the solid display 2 are selected, a 3D object is displayed as shown in FIG. 7 with pertinent colors.

A description will now be provided for selection of a range of grids to be displayed in step 410 and corresponding display.

FIG. 12 illustrates a user interface for selecting a range of grids to be displayed. As is apparent from FIG. 12, the user selects a square region to be displayed in the RGB color space by selecting a range of grids for each set of R values, G values and B values. When the user selects a range of grids to be displayed using the user interface, the message CHANGE_GRIDAREA for selecting a range of grids to be displayed is notified to the color analysis program, which updates 3D-object data in the following manner, in accordance with RGB-grid-range information attached to the message.

First, in the RGB color space, two types of combinations of triangles are generated in each of minimum quadrangles formed by grid points on the surface of the selected square region. FIG. 6 is a schematic diagram illustrating such combinations of triangles. Grid-point coordinates of vertices of these triangles are converted into corresponding L*a*b* coordinate values using the color-distribution-information data, and 3D-object data is provided from combinations of triangles after conversion. A combination of triangles is selected from the two combinations so as to maximize the volume of the 3D-object data. That is, when N minimum quadrangles formed by grid points are present in the RGB color space, 3D-object data is selected from $2^N$ combinations.

Figure 14:
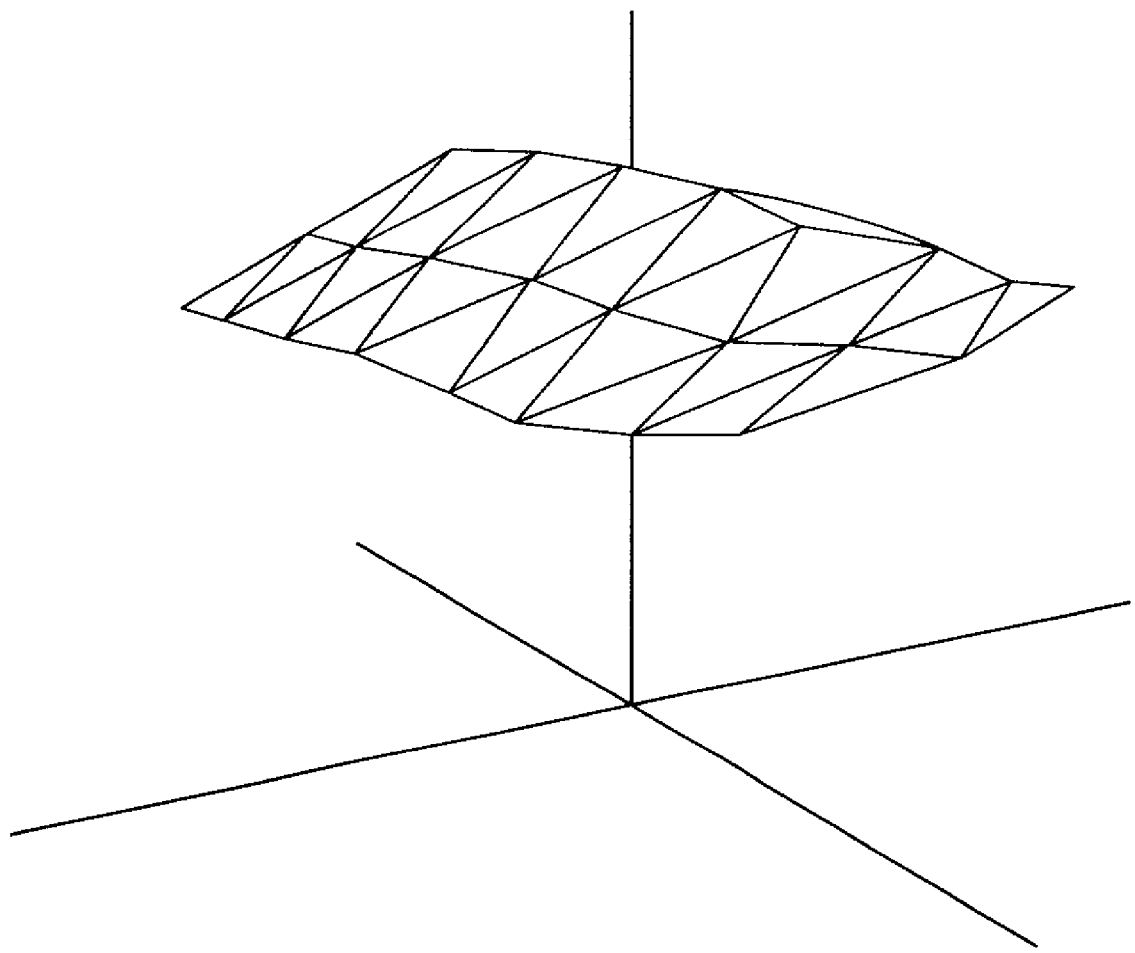
FIG. 14 is a diagram illustrating an example of display of 3D-object data.

FIG. 14 illustrates an example of display on the color monitor 107, when the number of grid points on each of R, G and B axes is 6 in color-distribution information, and ranges of grids to be displayed are indicated by broken lines represents a maximum grid region, and a range indicated by solid lines represents a square region. A point of intersection of a broken line and a solid line represents a grid point.

A description will now be provided of selection of an internal layer to be displayed in step 410 and corresponding display. In this operation, a range of RGB grids to be displayed is set only by setting a single value. Accordingly, internal analysis can be easily performed.

FIG. 15 illustrates a user interface for selecting an internal layer to be displayed. By selecting the number of internal layers to be displayed in the square region, the user selects a square region to be displayed in the RGB color space. When the user has selected an internal layer to be displayed using the user interface, the message CHANGE_SCOPE for selecting an internal layer to be displayed is notified to the color analysis program. The program converts the number of the internal layer to be displayed into RGB-grid-range information in the following manner.

When the number of an internal layer to be displayed is represented by sc, the number of grid points on the R axis is represented by Nr, the number of grid points on the G axis is represented by Ng, and the number of grids on the B axis is represented by Nb, the range of RGB grids becomes ([Rsc, RNr—1–sc], [Gsc, GNg—1–sc], [Bsc, BNb-1-sc]), where Ri is an R value for the i-th grid point on the R axis, Gi is a G value for the i-th grid point on the G axis, and Bi is a B value for the i-th grid point on the B axis.

That is, each of both ends of the maximum grid range is deleted by the amount of the assigned internal grid layer. If the number of the internal layer to be displayed sc is 0, the range of RGB grids equals the grid surface as in the above-described initial generation. Then, 3D-object data is updated in accordance with the RGB-grid-range information. Since the details of this updating processing is the same as the above-described ones, further description thereof will be omitted.

Figure 16:
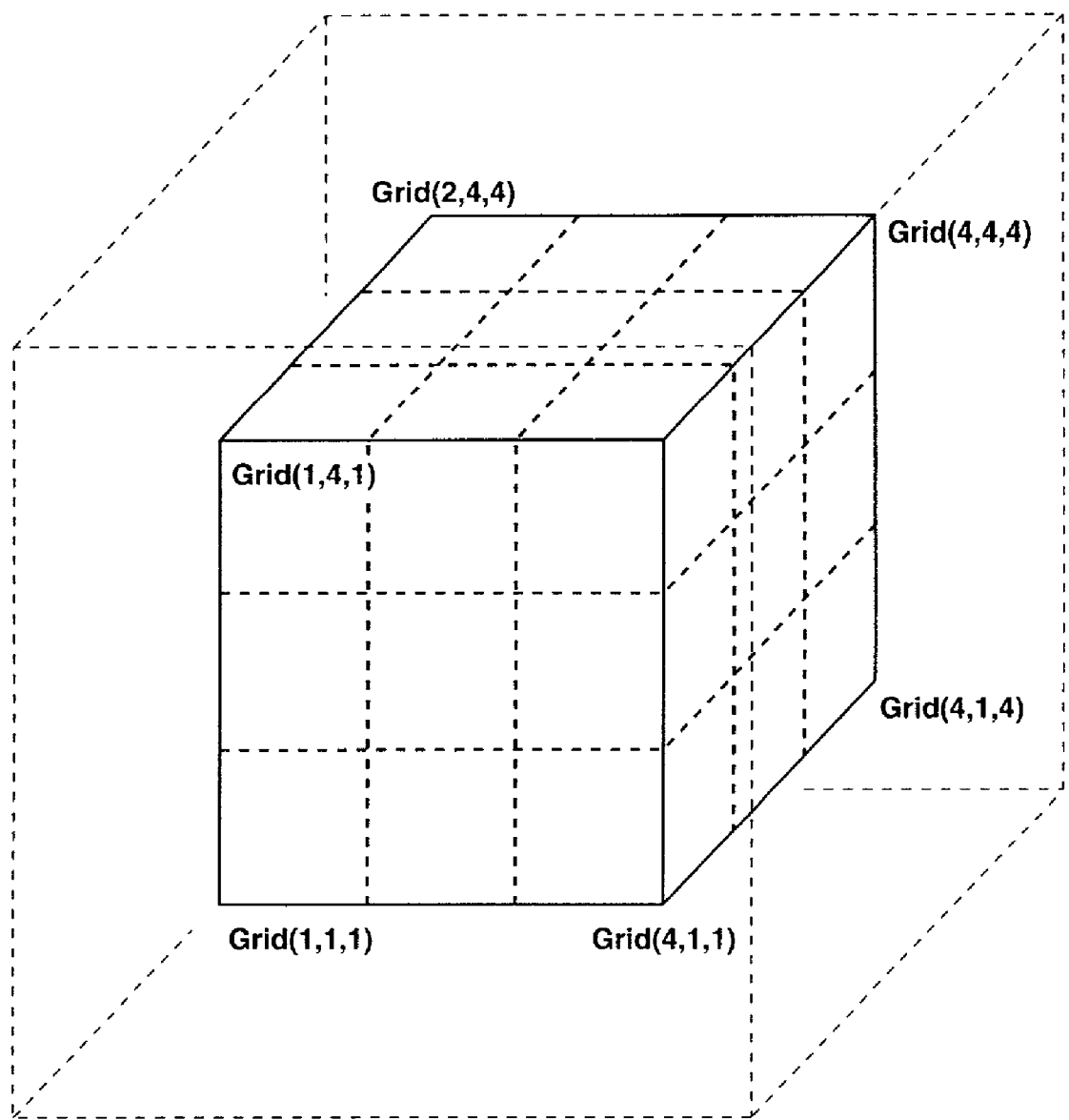
FIG. 16 is a diagram illustrating a range of a square region selected in an RGB color space.
Figure 17:
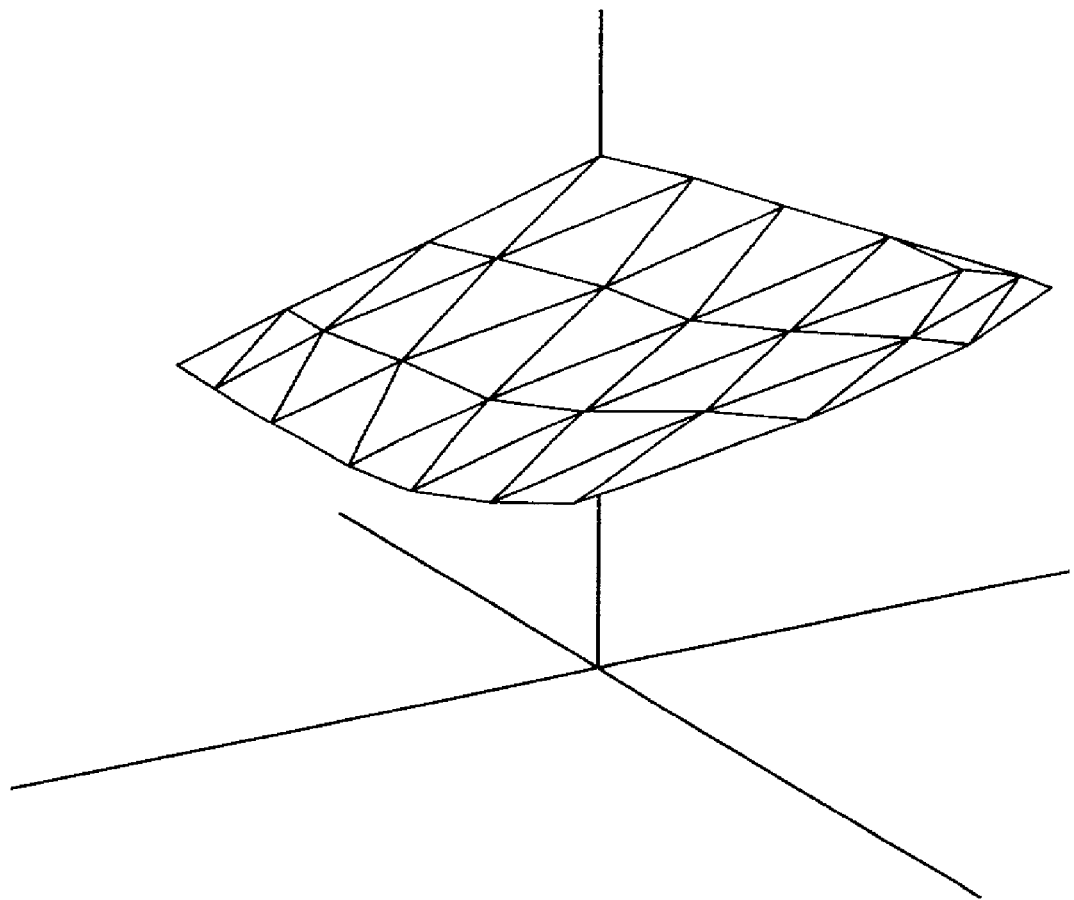
FIG. 17 is a diagram illustrating an example of display of 3D-object data.

FIG. 17 illustrates an example of display on the color monitor 107, when the number of grid points on each of R, G and B axes is 6 in color-distribution information, and the user selects the number of the internal layer to be displayed as 1. The range of grids in the RBG color space is as shown in FIG. 16. In FIG. 16, a range indicated by broken lines represents a maximum grid region, and a range indicated by solid lines represents a square range. A point of intersection of a broken line and a solid line represents a grid point.

A description will now be provided of selection of a range of hues to be displayed in step 411 and corresponding display. This processing is not performed unless the number and the step of grid points are equal on the R, G and B axes.

FIG. 18 illustrates a user interface for the user for selecting a rage of hues to be displayed. By selecting at least one of six ranges of hues to be displayed, the user selects a range of hues to be displayed in the RGB color space. When the user has selected a range of hues to be displayed using the user interface, the message CHANGE_HUEAREA for selecting a range of hues to be displayed is notified to the color analysis program, which updates 3D-object data in accordance with hue-selection information attached to the message in the following manner.

Figure 19:
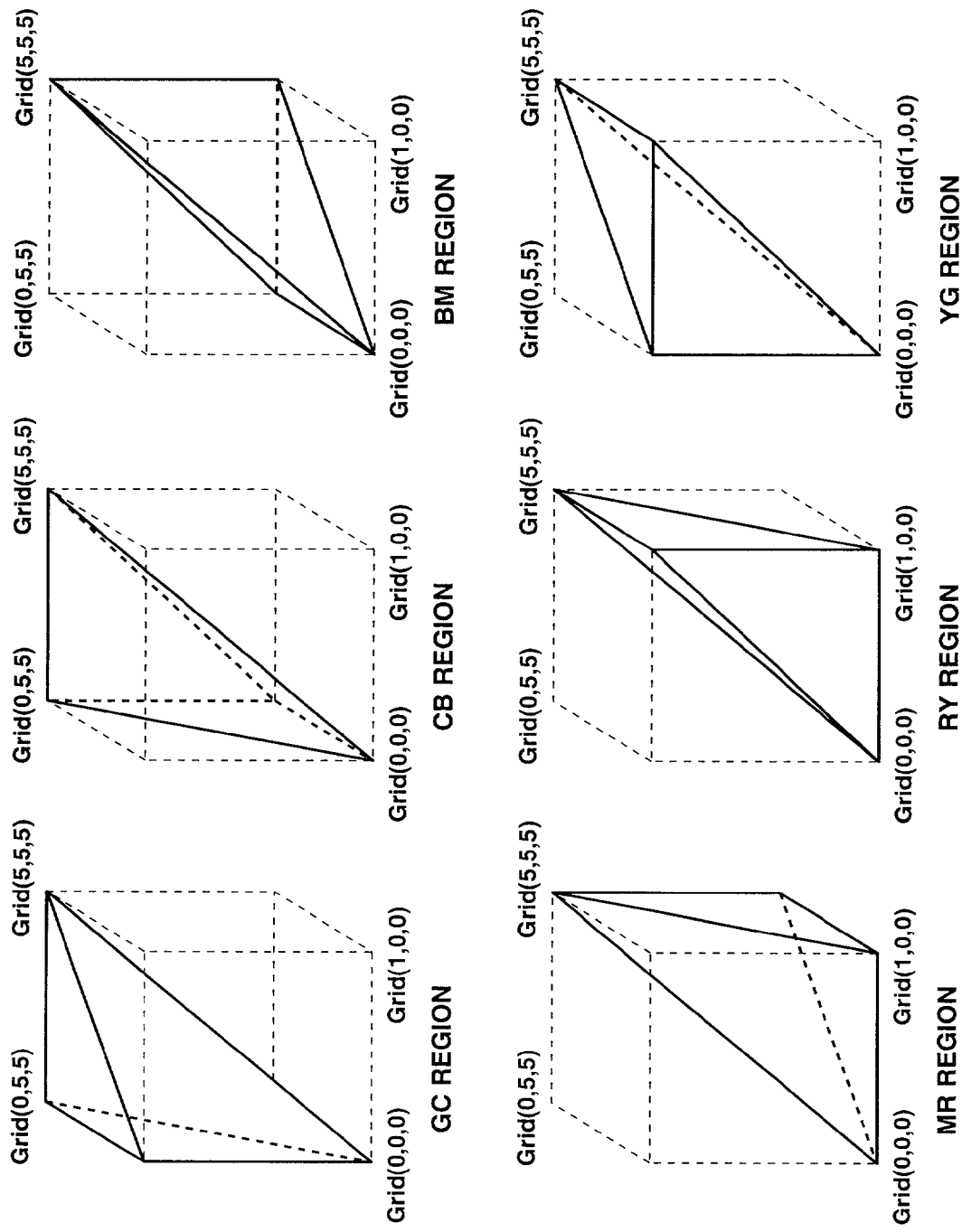
FIG. 19 is a schematic diagram illustrating a tetrahedral region selected in accordance with hue-selection information.

First, in the RGB color space, one of six tetrahedral regions shown in FIG. 19 is selected in accordance with hue-selection information.

Two types of combinations of triangles are generated in each of minimum quadrangles formed by grid points on the surface of the selected tetrahedral region. On a surface region where a quadrangle cannot be generated, a minimum triangle is generated. Then, grid-point coordinates of vertices of these triangles are converted into corresponding L*a*b* coordinate values using color-distribution-information data, and 3D-object data is generated from combinations of triangles after conversion. As in the case of selecting a range of grids to be displayed, a combination of triangles is selected from the two combinations so as to maximize the volume of the 3D-object data.

Figure 20:
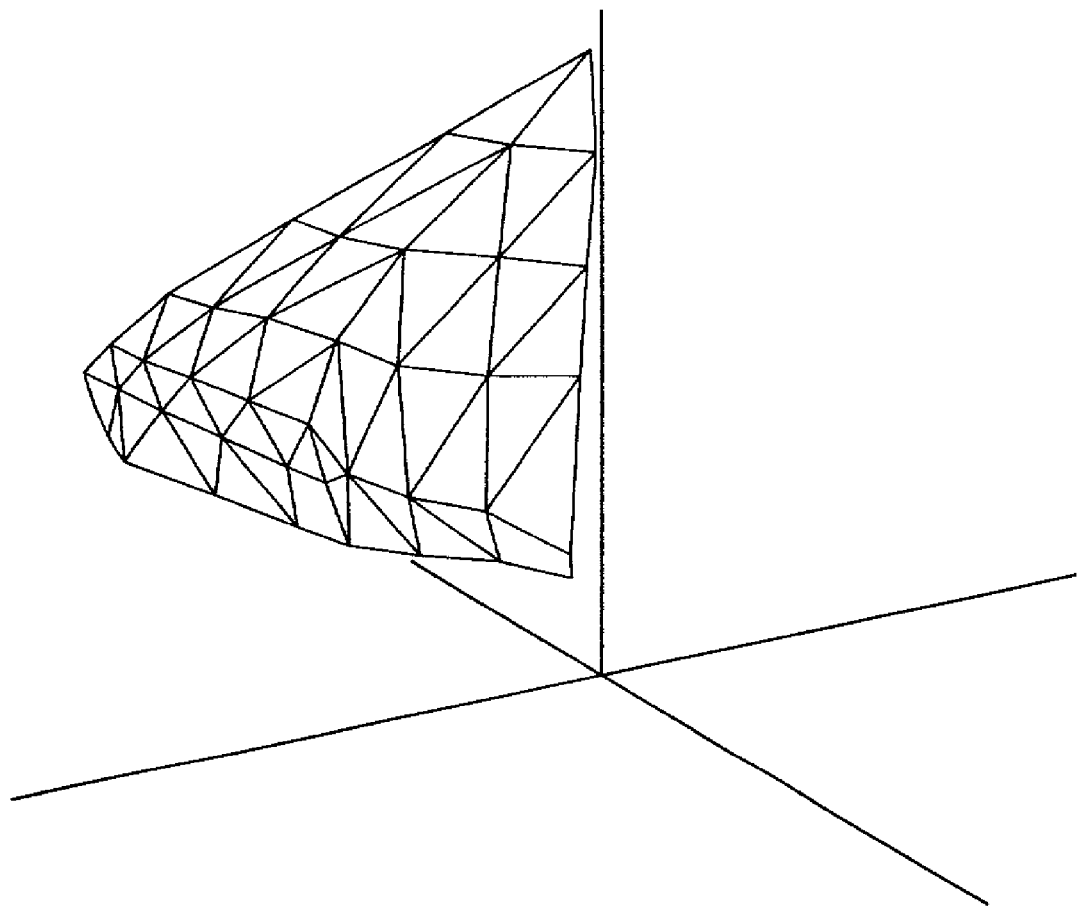
FIG. 20 is a diagram illustrating an example of display of 3D-object data.

FIG. 20 illustrates an example of display on the color monitor 107 when a range of hues to be displayed is selected as an MR region, in this embodiment.

FIG. 21 illustrates a user interface for the user for selecting a display surface. In each check box shown in FIG. 21, enable/disable is switched in accordance with the current 3D-object data. In the case of disable, the state of disable is shown by lightening the color of characters as in the check boxes of hue surface 1/hue surface 2. The user selects at least one arbitrary display surface assuming the state of disable from among 8 display surfaces.

When the user has selected a display surface using the user interface, the display-surface-selection message CHANGE_DISPLAYSURFACE is notified to the color analysis program, which updates 3D-object data based on display-surface-selection information attached to the message, in the following manner.

Figure 22:
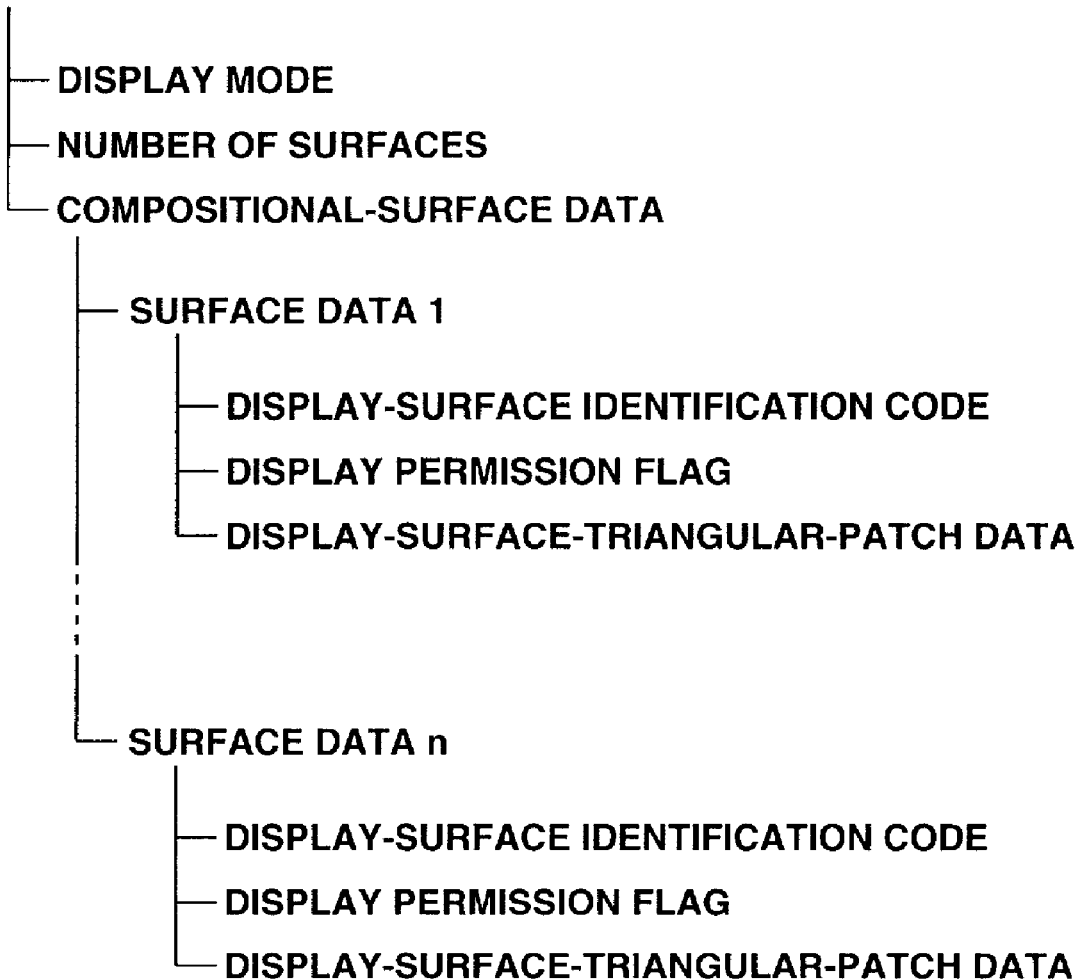
FIG. 22 is a diagram illustrating the internal structure of 3D-object data.
Figure 23:
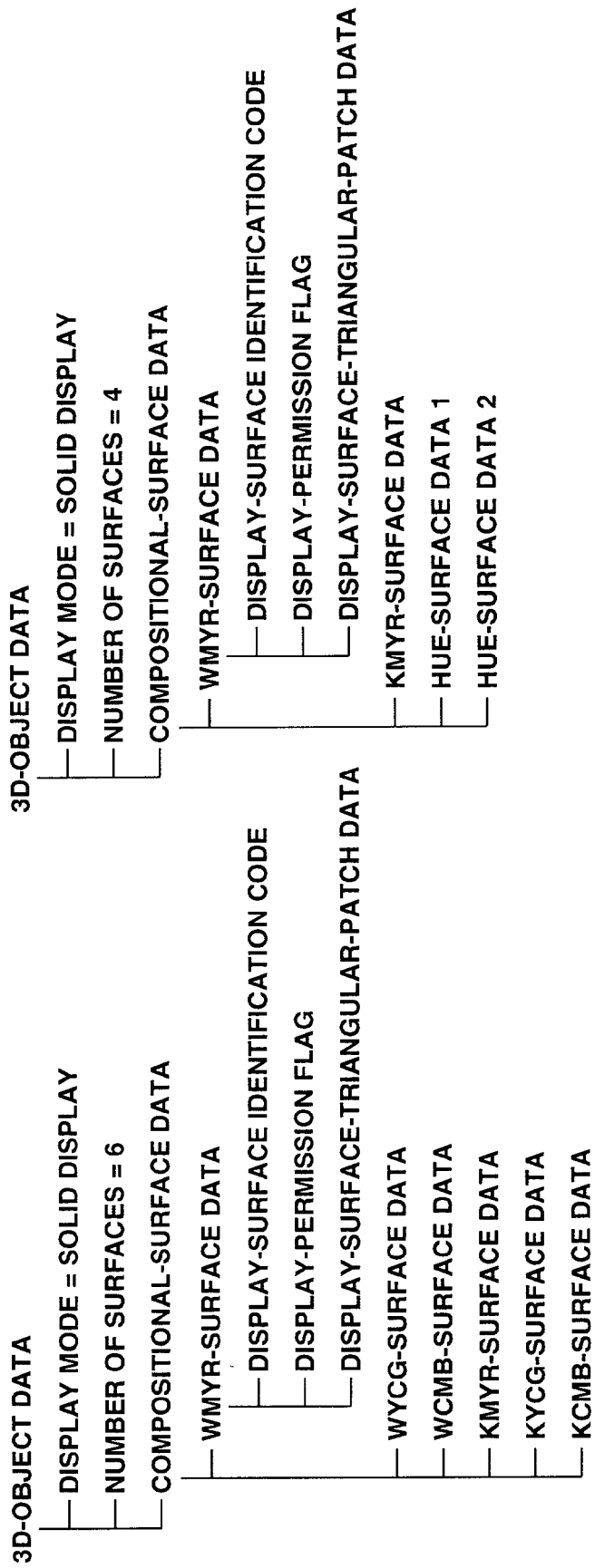
FIG. 23 is a diagram illustrating an example of the internal structure of 3D-object data.
Figure 24:
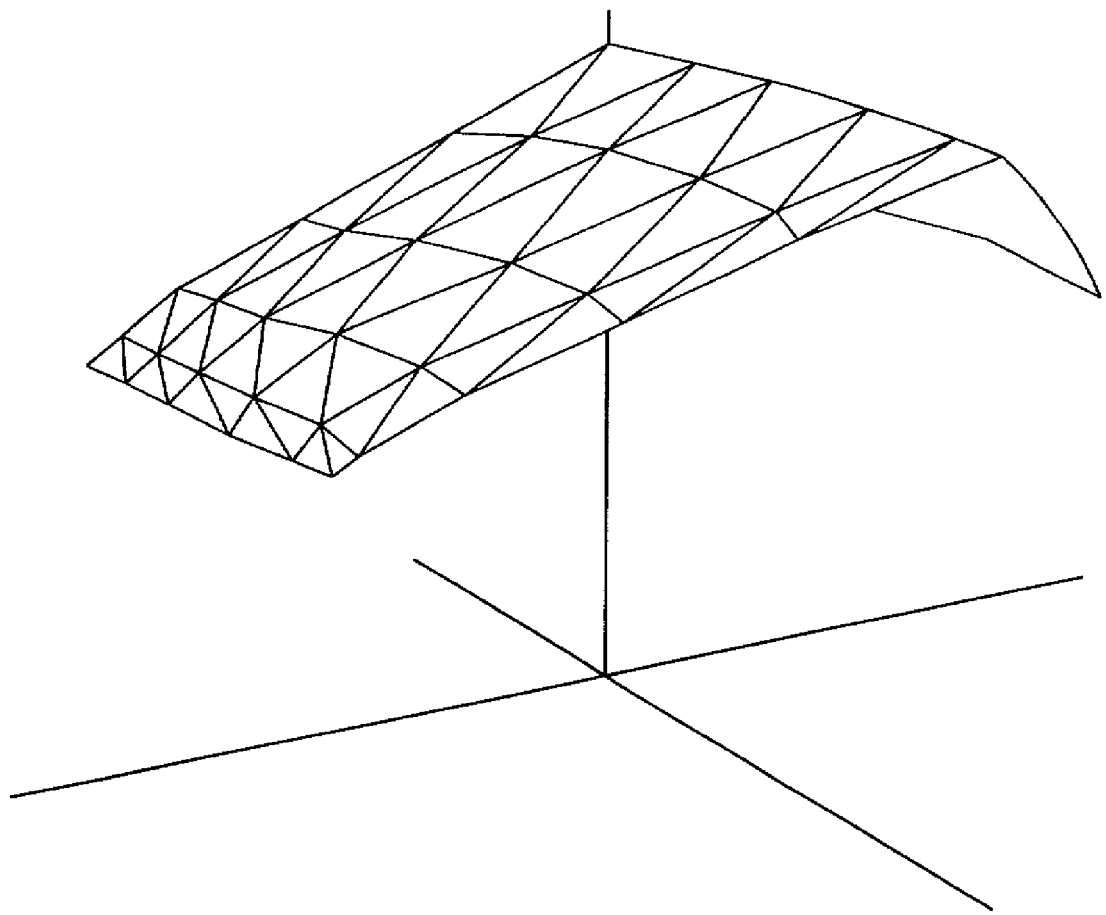
FIG. 24 is a diagram illustrating an example of display of 3D-object data.

The internal structure of 3D-object data is as shown in FIG. 22. For example, the structure of 3D-object data generated by assigning a range of RGB grids is as shown in FIG. 23A, and the structure of 3D-object data generated by assigning a range of hues to be displayed is as shown in FIG. 23B. Display permission/prohibition is updated in accordance with display-surface-selection information. FIG. 24 illustrates an example of display on the color monitor 107 when a WMYR surface and a WYCG surface are selected as display surfaces.

Although in this embodiment, the display device is limited to a monitor, it is, of course, possible to output data to a printer, a plotter or the like.

The color system for providing grid points is not limited to the RGB color system. Any other color system, such as a CMY color system, an XYZ color system, a Luv color system, a L*a*b* color system or the like, may also be used.

Similarly, the color coordinates of sample points are not limited to the L*a*b* color system. Any other color system, such as the RGB color system, the CMY color system, the XYZ color system, the Luv color system or the like, may also be used.

As described above, according to this embodiment, it is possible to qualitatively/intuitively determine/evaluate local/overall information of color-distribution information.

The individual components designated by blocks in the drawings are all well known in the color-information processing method arts and their specific construction and operation are not critical to the operation or the best mode for carrying out the invention.

As many apparently widely different embodiments of the present invention can be made without departing from the spirit and scope thereof, it is to be understood that the invention is not limited to the specific embodiments except as defined in the appended claims.

What is claimed is:

1. A color-information processing method for displaying a three-dimensional object of color distribution based on sample points, said method comprising:
   a color-distribution-information input step, of inputting color coordinate values in a second color system corresponding to sample points in a first color system;
   a viewpoint information setting step, of setting viewpoint information according to a user instruction;
   a range setting step, of setting a range in color distribution corresponding to the sample points, according to a user instruction;
   a step of selecting sample points corresponding to the range from the sample points in the first color system and obtaining the color coordinate values in the second color system corresponding to the selected sample points;
   a generation step of generating surface information of the three-dimensional object based on the obtained color coordinate values in the second color system corresponding to the selected sample points and generating color information of the surface of the three-dimensional object based on the obtained color coordinate values in the second color system corresponding to the selected sample points; and
   a display step of displaying the three-dimensional object corresponding to the viewpoint information based on the surface information of the three-dimensional-object and the color information of the surface,
   wherein the sample points are regularly placed in the form of a grid in the first color system,
   wherein the surface information of the three-dimensional object consists of triangles, and
   wherein each triangle corresponds to one combination of the triangles selected, such that a volume of the three-dimensional object is increased, from two combinations of triangles generated in each of minimum quadrangles formed by the selected sample points.

2. A method according to claim 1, wherein said range setting step sets grid ranges for each color component in the first color system.

3. A method according to claim 1, wherein said display step performs pseudo-three-dimensional display of the three-dimensional object of the color distribution.

4. A method according to claim 1, wherein said range setting step sets an internal layer to be displayed.

5. A computer-readable medium encoded with a computer program for executing a color-information processing method for displaying a three-dimensional object of color distribution based on sample points, said program comprising:
   a color-distribution-information input step, of inputting color coordinate values in a second color system corresponding to sample points in a first color system;
   a viewpoint information setting step, of setting viewpoint information according to a user instruction;
   a range setting step, of setting a range in color distribution corresponding to the sample points, according to a user instruction;
   a step of selecting sample points corresponding to the range from the sample points in the first color system and obtaining the color coordinate values in the second color system corresponding to the selected sample points;
   a generation step of generating surface information of the three-dimensional object based on the obtained color coordinate values in the second color system corresponding to the selected sample points and generating color information of the surface of the three-dimensional object based on the obtained color coordinate values in the second color system corresponding to the selected sample points; and
   a display step of displaying the three-dimensional object corresponding to the viewpoint information based on the surface information of the three-dimensional object and the color information of the surface,
   wherein the sample points are regularly placed in the form of a grid in the first color system,
   wherein the surface information of the three-dimensional object consists of triangles, and
   wherein each triangle corresponds to one combination of the triangles selected, such that a volume of the three-dimensional object is increased, from two combinations of triangles generated in each of minimum quadrangles formed by the selected sample points.

6. An apparatus for processing color-information for displaying a three-dimensional object of color distribution based on sample points, comprising:

color-distribution-information means for inputting color coordinate values in a second color system corresponding to sample points in a first color system;

viewpoint information setting means for setting viewpoint information according to a user instruction;

range setting means for setting a range in color distribution corresponding to the sample points, according to a user instruction;

a selector to select sample points correspond to the range from the sample points in the first color system and to obtain the color coordinate values in the second color system corresponding to the selected sample points;

a generator for generating surface information of the three-dimensional object based on the obtained color coordinate values in the second color system corresponding to the selected sample points and generating color information of the surface of the three-dimensional object based on the obtained color coordinate values in the second color system corresponding to the selected sample points; and a display to display the three-dimensional object corresponding to the viewpoint information based on the surface information of the three-dimensional object and the color information of the surface, wherein the sample points are regularly placed in the form of a grid in the first color system, wherein the surface information of the three-dimensional object consists of triangles, and wherein each triangle corresponds to one combination of the triangles selected, such that a volume of the three-dimensional object is increased, from two combinations of triangles generated in each of minimum quadrangles formed by the selected sample points.

7. An apparatus for processing color-information for displaying a three-dimensional object of color distribution based on sample points, comprising:

a color-distribution-information device to input color coordinate values in a second color system corresponding to sample points in a first color system;

a viewpoint information setting device to set viewpoint information according to a user instruction;

a range setting device to set a range in color distribution corresponding to the sample points, according to a user instruction;

a selector to select sample points corresponding to the range from the sample points in the first color system and to obtain the color coordinate values in the second color system corresponding to the selected sample points;

a generator for generating surface information of the three-dimensional object based on the obtained color coordinate values in the second color system corresponding to the selected sample points and generating color information of the surface of the three-dimensional object based on the obtained color coordinate values in the second color system corresponding to the selected sample points; and a display to display the three-dimensional object corresponding to the viewpoint information based on the surface information of the three-dimensional object and the color information of the surface, wherein the sample points are regularly placed in the form of a grid in the first color system, wherein the surface information of the three-dimensional object consists of triangles, and wherein each triangle corresponds to one combination of the triangles selected, such that a volume of the three-dimensional object is increased, from two combinations of triangles generated in each of minimum quadrangles formed by the selected sample points.

* * * * *

UNITED STATES PATENT AND TRADEMARK OFFICE
CERTIFICATE OF CORRECTION

| | |
|---|---|
| PATENT NO. | : 7,315,309 B2 |
| APPLICATION NO. | : 10/057950 |
| DATED | : January 1, 2008 |
| INVENTOR(S) | : Hirochika Matsuoka et al. |

Figure 13:
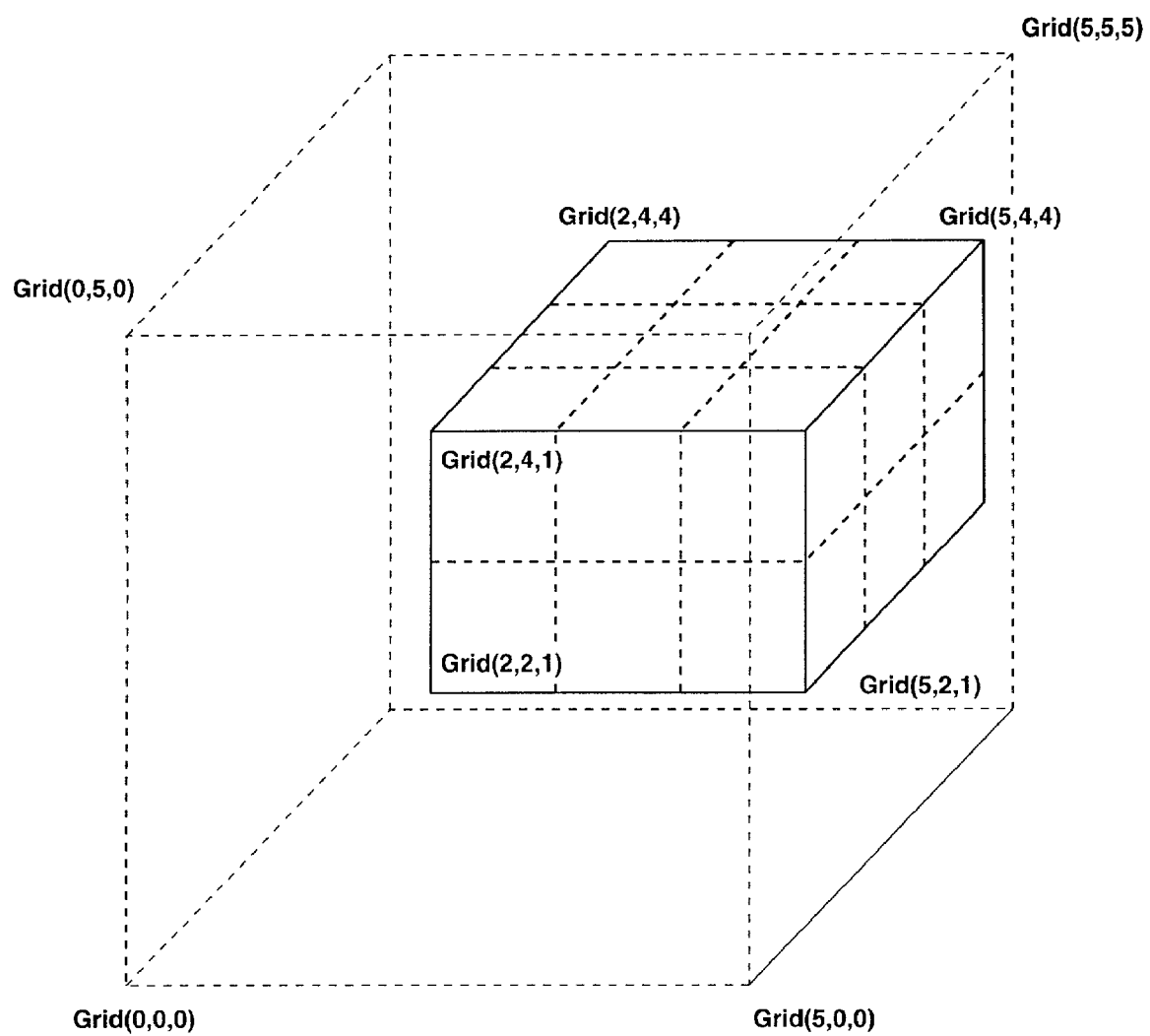
FIG. 13 is a diagram illustrating a range of grids in an RGB color space.

It is certified that error appears in the above-identified patent and that said Letters Patent is hereby corrected as shown below:

COLUMN 7:

Line 57, "are indicated" should read --are selected as [2, 5], [2, 4] and [1, 4] on R, G and B axes, respectively. The range of grids in the RBG color space is as shown in FIG. 13. In FIG. 13, a range indicated--.

COLUMN 11:

Line 14, "correspond" should read --corresponding--.

Signed and Sealed this

Tenth Day of February, 2009

JOHN DOLL
*Acting Director of the United States Patent and Trademark Office*